No. 774,286. Patented November 8, 1904.

UNITED STATES PATENT OFFICE.

FRANZ SUTER, OF BERLIN, GERMANY.

CEMENT.

SPECIFICATION forming part of Letters Patent No. 774,286, dated November 8, 1904.

Application filed July 13, 1904. Serial No. 216,428. (No specimens.)

*To all whom it may concern:*

Be it known that I, FRANZ SUTER, a citizen of the Empire of Germany, residing at Berlin, in the Kingdom of Prussia, Germany, have invented a new and Improved Cement, of which the following is a specification.

My invention relates to a binding medium for securing linoleum and the like.

The securing of linoleum by the method hitherto used—that is to say, by means of paste—has the drawback that the paste readily absorbs moisture, decomposes, and destroys the canvas backing of the linoleum, at the same time almost completely losing its adhesive power. Suggestions have already been made to employ instead of paste a binding medium in which rosin or rosin substitutes are used, and suggestions have also been made to impart greater adhesive power to such linoleum-cement by adding to it tar-asphalt, which at the same time imparts to it the property of protecting linoleum against the dampness of the floor.

This invention relates to an adhesive substance for linoleum and the like in which rosins or rosin substitutes are used. The substance according to this invention differs, however, from the well-known ones by the fact that its adhesive power on the one hand and its power of protecting against dampness on the other hand are rendered much greater by the addition of certain substances than could be effected by the addition of coal-tar asphalt. These other substances are molasses and a product of distillation of asphalt—for instance, that sold on the market under the name of "primol," which dries hard and protects from dampness, or an asphalt distillate similar to primol. The addition of molasses greatly increases the adhesive power, while the addition of the asphalt distillate renders the protection from dampness much more efficient than could be attained by coal-tar asphalt, for many residues contained in the latter prevent it from attaining the object in question and also unfavorably affect the adhesive power.

The manufacture of the cement or binding medium according to this invention is effected by melting rosins of any kind—such, for instance, as copal—molasses being gradually added to the solution. The whole mass is then cooled and diluted to the required extent with alcohol which had been previously mixed with the asphalt distillate.

Primol is a product of distillation of asphalt, of black color. The degree of fluidity (according to Engler's test and compared to water of 20° centigrade as unit) is 0.99 at 20° centigrade, the specific gravity at 17.5° centigrade is 0.9140, and the coefficient of refraction at 18° centigrade equals 1.5236. Primol can be mixed in any desired proportion with absolute alcohol.

The binding medium produced in the manner described has the property of very permanently securing or cementing linoleum or similar substances to supports of any kind, such as wood, concrete, cement, and flagstones. The cementing-power is very great. The mass is, besides, always ready for use and can be applied without any auxiliary operations, such as heating, &c. It dries very quickly and does not become brittle, but retains a certain elasticity, which is due to the addition of molasses. The power of protection against moisture is so great that linoleum can be secured even to quite new plaster floor without being effected by moisture.

The cement in question can be used not only for linoleum, but also for other similar substances—such as, for instance, leather, wallpaper, and its substitutes known under the name of "lincrusta."

As an example, the following proportions of the constituents may be used in one hundred kilograms: fifty-five kilograms molasses, twenty-five kilograms rosin, ten kilograms copal, five kilograms spirits, and five kilograms primol.

It is to be understood that the composition of the binding material may be varied without departing from this invention.

Having thus fully described my invention, what I claim as new, and desire to secure by Letters Patent, is—

1. The herein-described composition of matter containing molasses, asphalt distillate, rosin and alcohol.

2. The herein-described composition of matter for securing linoleum and the like, containing molasses, asphalt distillate, rosin, copal and spirits.

3. The herein-described composition of matter for securing linoleum and the like, consisting of molasses fifty-five kilograms, asphalt distillate five kilograms, rosin twenty-five kilograms, copal ten kilograms, and spirits five kilograms.

In witness whereof I have hereunto signed my name, this 27th day of June, 1904, in the presence of two subscribing witnesses.

FRANZ SUTER.

Witnesses:
 HENRY HASPER,
 WOLDEMAR HAUPT.